United States Patent Office 3,059,664
Patented Oct. 23, 1962

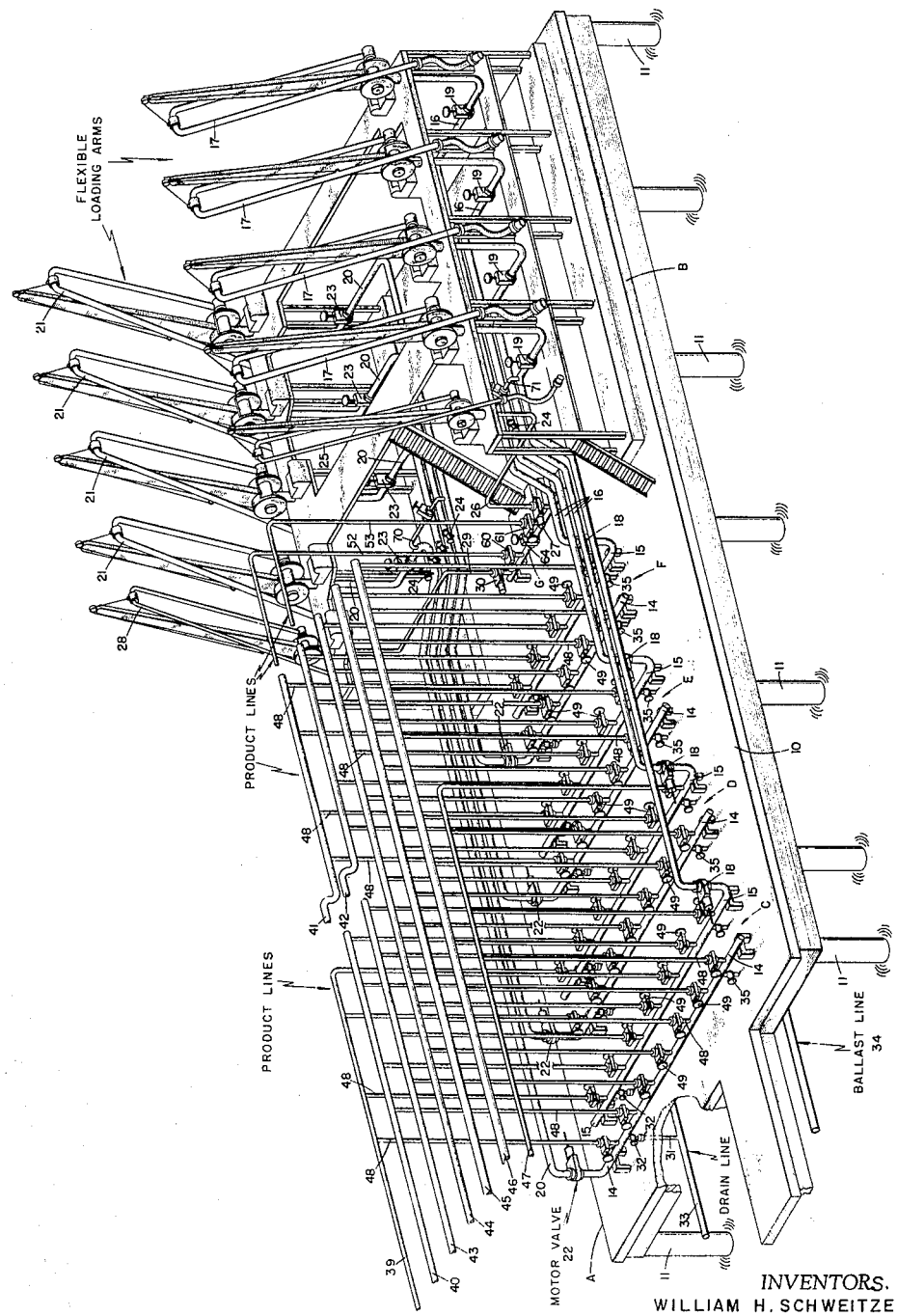

3,059,664
MARINE LOADING DOCK
William H. Schweitzer and George E. Crist, Baytown, Tex., assignors, by mesne assignments, to Esso Research and Engineering Company, Elizabeth, N.J., a corporation of Delaware
Filed Apr. 29, 1960, Ser. No. 25,720
8 Claims. (Cl. 137—356)

This invention relates to a transfer system for marine operations. More particularly, this invention is directed to facilities for transferring liquid products to or from a vessel.

Substantial tonnage of liquid materials are transported by water in especially constructed vessels such as tankers, barges, etc. The size of such vessels makes it desirable to transport more than one type of liquid material at a time. More particularly and with respect to refinery petroleum products such as gasoline, solvents, heating oils, chemicals, etc., it is normally desirable and even necessary to carry a plurality of finished products in one vessel.

The need for carrying a plurality of finished petroleum products in one vessel such as a tanker or barge creates serious problems with respect to the loading and unloading of the vessel in order to prevent contamination by commingling of the various products being transferred.

In the past it has been the custom to utilize a plurality of loading lines or hoses connected with on-shore loading facilities in order to effect a transfer. However, numerous problems are encountered with a transfer arrangement of such a nature.

Common manifolding of finished products, even though desirable, has long been avoided because of the possibility of contaminating by commingling of finished liquid products. This is particularly true where the manifold arrangement has only one valve between unlike products. It is mandatory that a liquid product transfer system incorporating a manifold be proven contamination free before it is acceptable. Some manifolding has been provided at various installations but only with the use of line blinds or double-block valves with a bleeder located between the valves. Such an arrangement proves to be a space-consuming, slow-operating, and expensive operation.

A tanker vessel's time in port for the purpose of transferring products to and from the vessel is very expensive and critical. The present invention provides a manifold transfer system whereby the port time of transfer vessels is reduced to a minimum.

The present invention also provides a liquid product transfer system incorporating a manifold whereby a plurality of various types of finished products can be transferred between the vessel and on-shore installations without commingling or contaminating the transferred products. Commingling of some finished petroleum products can be very critical even to the smallest amount of contamination, and with others the critical point of contamination is not so low. The system afforded by the present invention, however, eliminates the possibility of any contamination during the process of transferring various liquid products simultaneously.

The manifold of the present invention also provides means to service the tankers or barges during ballasting or deballasting.

It is a further object of the present system to provide an arrangement so as to have maximum flexibility in the loading and unloading of a vessel or vessels in a restricted operating area, without any possibility of contamination between products and be operable with minimum manpower.

Briefly described, the invention is directed to a dock or loading platform having a plurality of loading arms at a loading level and having a valved header connected to each of said loading arms below said loading level, a plurality of product lines greater in number than the number of said loading arms extending transversely of and above said headers, a plurality of valved risers connected into the upper side of each of said headers, said risers connecting each of said headers with a plurality of said product lines, a drain line positioned below and extending transversely of said headers, a valve drain conduit connecting the lower side of each of said headers with said drain line, a ballast line positioned below and transversely of said headers, said ballast line being interconnected to at least one of said headers by a valve ballast conduit and means connected to each of said headers for introducing a flushing fluid through said headers.

The valve drain conduit of each of the headers is located at about the lowest horizontal level of the transfer system and the piping or conduits connecting each of the headers with the loading arms is slanted slightly upwardly with respect to the drain conduits whereby gravity drainage of all of the lines of the system occurs when desired.

As all valves are subject to leaking after some use, the valves used in the present system, especially those contained in the product riser conduits and those directly connected into the headers are of the "block and bleeder" type. This type of valve allows any leakage across the seat to bleed into the valve housing which is connected by valved bleed conduits into the main drain line of the system. As each valve is so provided, the bleed lines also provide a means to sample the fluid being transferred through any particular valve.

A motor-operated valve is positioned in each of the conduits connected between the headers and the loading arms and serves as an operating valve after the header has been lined out with the desired product. This valve serves as a master valve for each header and can be used to isolate the dock or loading platform from the vessel in case of an emergency.

The efficiency of the system of the present invention will be more obvious with reference to the following description taken in conjunction with the drawing, which is a simplified isometric view showing the general layout of the system.

Referring now to the drawing, numeral 10 designates a dock or platform which is positioned above the water surface by means of piling or caissons 11. The platform 10 is somewhat rectangular in shape so as to afford boat docking sides designated A and B.

Arranged in pairs designated C, D, E, and F are a plurality of header pipes 14 and 15, the headers 14 of each pair being adapted to facilitate product transfer on the A side of the platform and the headers 15 on the B side of the platform. As shown, the pairs C, D, E, and F are spaced apart a substantial distance so as to provide a passageway for operating personnel. A single header G is spaced apart from the pair of headers F. Header extension conduits 16 connect each of the headers 15 to one of a plurality of flexible loading arm assemblies 17 located at a loading level at the opposite end and on the B side of the platform 10. Fluid flow through the extension 16 is controlled by motor valves 18. The extension conduits 16 slant slightly upward from the headers 15 toward the loading arms so that gravity draining of the extensions can be maintained when desired. Each of the extension conduits 16 is provided with an additional valve 19 located adjacent the loading arms.

The headers 14 of the header pairs C, D, E, and F are each connected by extension conduits 20 to one of a plurality of loading arms 21 located across from the arms 17 on the A side of the platform 10. The flow of fluid through these extension conduits is controlled by motor valves 22. Valves 23 are also provided in extension conduits 20 adjacent the loading arm assemblies. The extensions 20, as are the extensions 16, slant upwardly away from the headers to facilitate gravity draining. All of the extensions 16 and 20 are provided with valve connections 24 for the purpose of introducing a flushing fluid into the system when desired. The loading arm assemblies are conventional and well-known to the art and are shown schematically in the drawing. However, the arms are positioned at a level whereby they can service a tanker that may stand substantially higher than the platform 10 or a barge that may be lower than the platform 10.

Header pipe G connects to loading arm assembly 25 on the B side of the platform 10 by conduit 26, which is controlled by a motor valve 27. Likewise, the header connects to a loading arm assembly 28 on the A side of the platform by means of conduit 29, which is controlled by motor valve 30.

Each of the headers 14 and 15 is provided with drain lines 31 which are connected into the underside of the headers at the lowest level of the headers. The drain lines 31 are controlled by valves 32 and are all connected into a larger drain 33 which runs below the platform 10 and transversely of the headers. The line 33 is slanted so as to gravity drain to a collection tank or sump on shore from where the collected fluids may be pumped to a reprocessing installation.

Each of the headers 14 and 15 are connected into a ballast line 34 by lines controlled by valves 35. The line 34, as does line 33, is positioned below the platform 10 and runs transversely of the headers 14 and 15 whereby ballast may be pumped from a vessel to a ballast collecting tank on shore.

Elevated and horizontally running lines 39—47 are connected into the various headers 14 and 15 by vertical riser conduits generally designated 48. Fluid flow through these lines is controlled by manifold valves 49. The header assembly G is connected to overhead lines 50 and 51 by vertical risers 52 and 53, respectively, which are controlled by valves 60 and 61, respectively. Header G is provided with a block valve 64 whereby products pumped through lines 50 and 51 can be completely isolated one from the other. As shown in the drawing, some of the overhead lines connect into all of the headers of the pairs C, D, E, and F and some of them only tie into two pairs of headers. The arrangement of these connections, however, may be made as desired with regard to the amount and variations of the products being transferred. It is desirable that each product line be connected into at least one pair of headers so that the product involved may be displaced to either or both loading areas of the platform 10.

As shown, the header extensions 20 of headers 14 of the pairs C and F are interconnected by a valved conduit 70 adjacent the loading arms 21. Likewise, the extensions 16 of the headers 15 of the pairs C and F are connected by a valved conduit 71. These conduits 70 and 71 afford more flexibility to the system. For example, if a certain liquid were being transferred to the aft section of a vessel through extension 20 of header 14 of the pair C and it was desired to switch to the forward section to continue the transfer, the operation would be as follows. The motor valve 22 of the extension 20 of the F header is closed, valve 23 of the same extension is opened, the valve in line 70 is opened and then the valve 23 of the extension 20 of the C pair is closed. It is obvious that other flow paths may be had by use of the conduits 70 and 71.

For obvious reasons of clarity, the drawing shows a maximum of seven connections into any one header; however, as many risers as desired may be placed on each header. The valves 49 may be placed as close together as practical in regard to performing maintenance on the valves. The headers are positioned in spaced-apart pairs as shown so that an aisle or passageway for operating personnel is afforded therebetween. The header extensions 16 and 20 are elevated for the same reason. All of the valves 49 are positioned at a level whereby they are easily accessible to operating personnel in the passageways between the headers.

The valves used in the present system, especially those contained into the riser conduits and those connected directly into the headers are of the "block and bleeder" type. Although not shown in the drawing the body of each valve such as 49 is connected by a valved bleeder line so as to drain into a drain conduit which is positioned parallel to and just below each header. The drain conduit itself is open to atmospheric pressure and drains into the main line 31. With this arrangement any leakage across the valve seat bleeds into the valve body and from there into the drainage system.

Header pairs C, D, E, and F and their connecting lines are for the purpose of transferring so-called clean liquid products while header assembly G is used for so-called dirty products which are desirable to be completely isolated from the remainder of the system. For maximum efficiency of operation of such a system, it is desirable to have a separate product line available for each product being transferred. It is also possible in such a system as disclosed to space apart several groups of loading arms whereby several vessels may be serviced on each side of the platform. With the drain line 33 positioned below the header assemblies of the system and the product lines, their connecting risers, header extensions, and the loading arms positioned above the header, it is obvious that the entire system is subject to gravity draining and flushing when desired.

From the foregoing description, it can be seen that the present invention provides a manifold that meets the requirement of a system that can be operated without any possibility of contamination between products, provide maximum flexibility of loading in a restricted operating area, and be operable with a minimum of manpower.

Having fully described and illustrated the present invention, what is claimed is:

1. In a dock having a plurality of loading arms at a loading level the improvement which comprises a plurality of valved headers positioned below said loading level, each of said headers connected by a valved header extension conduit to one of said loading arms, a plurality of product lines greater in number than said loading arms extending from onshore storage facilities along said dock above and transversely of said headers, a plurality of valved risers connecting each of said headers with a plurality of said product lines, a drain return line positioned below the level of said headers, and a valved conduit connecting the bottom side of each of said headers with said drain return line.

2. A device as in claim 1 wherein said headers are arranged in paired parallelism with each other and wherein each pair of headers is spaced apart from an adjacent pair to provide an aisle space.

3. A device as in claim 2 wherein said loading arms are arranged in groups on opposite sides of said dock whereby vessels may be loaded on both sides simultaneously.

4. A device as in claim 2 wherein the valves connected into said headers and said risers are of the block and bleeder type.

5. In a dock having a plurality of loading arms at a loading level, the improvement which comprises a plurality of valved headers positioned at a level below said loading level, each of said headers connected by a valved header extension conduit to one of said loading arms, said extension conduits slanting continuously upward from said headers to said loading arms, a plurality of product lines, greater in number than said loading arms extending from onshore storage facilities along said dock above and transversely of said headers, a plurality of vertical valved risers connecting each of said headers with a plurality of said product lines, a drain line positioned below and extending transversely of said headers, a valved conduit connecting each of said headers with said return line and a ballast line below said dock connected to the underside of each of said headers by a valved ballast conduit, and means connected into each of said extension conduits for flushing said extension, said headers, and said loading arms.

6. A device as in claim 5 wherein said headers are arranged in paired parallelism with each other and wherein each pair is spaced apart from an adjacent pair to provide an aisle space.

7. A device as in claim 5 wherein the valves connected into said headers and said risers are of the block and bleeder type.

8. A device as in claim 5 wherein said loading arms are arranged in groups on opposite sides of said dock whereby vessels may be loaded on both sides of said dock simultaneously.

References Cited in the file of this patent

UNITED STATES PATENTS

| | | |
|---|---|---|
| 1,756,830 | Marshall | Apr. 29, 1930 |
| 2,160,683 | Spaeth | May 30, 1939 |
| 2,644,479 | Rowley | July 7, 1953 |
| 2,922,446 | Sheiry | Jan. 26, 1960 |
| 2,934,102 | Martin | Apr. 26, 1960 |